May 27, 1941.　　A. F. TREMBLAY　　2,243,267
METHOD OF AND APPARATUS FOR BLOWING GLASS
Filed Oct. 13, 1937　　3 Sheets-Sheet 1
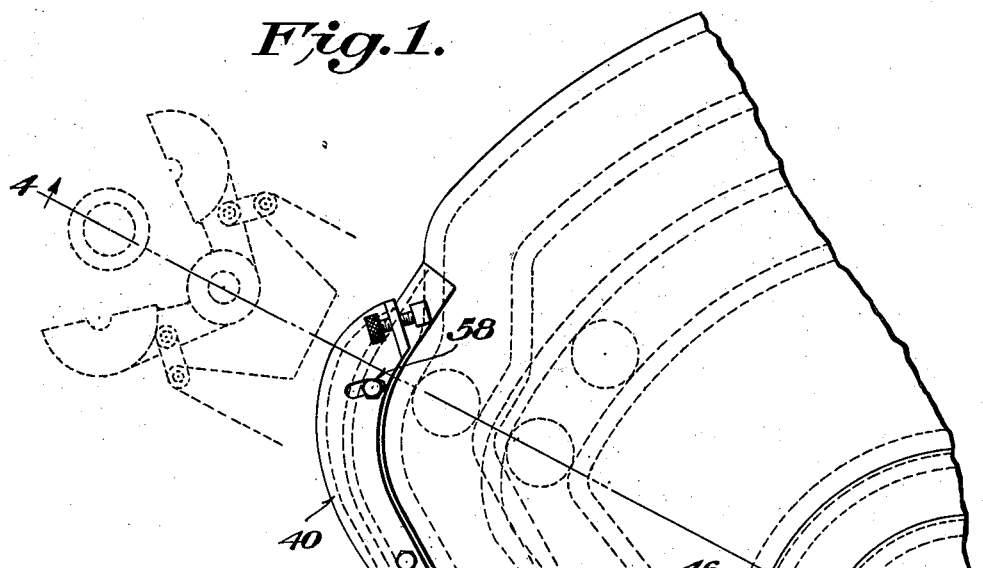
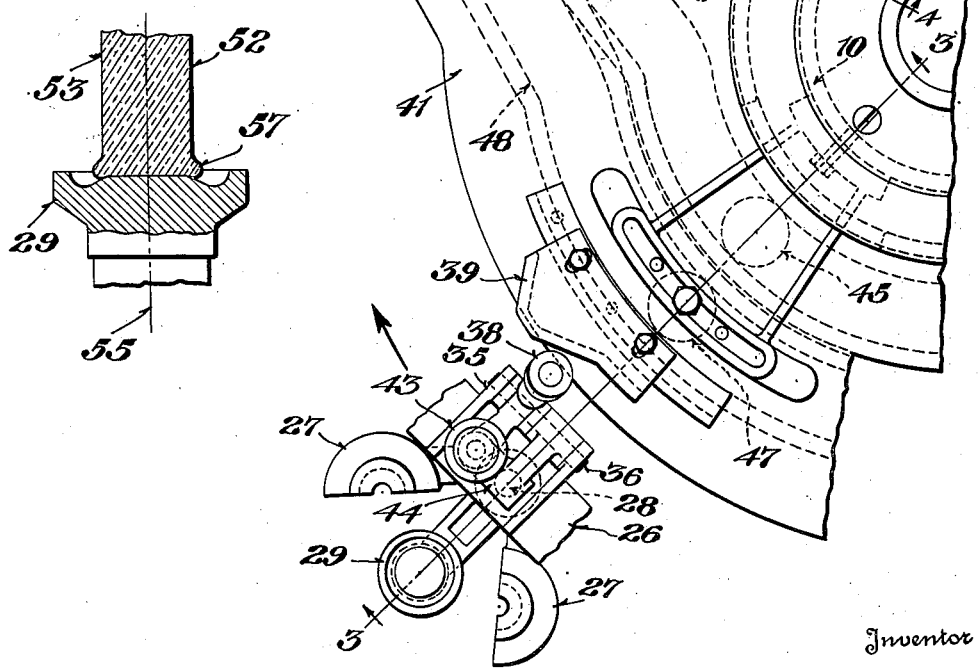
Inventor
Albert F. Tremblay
By Owen & Owen
Attorneys

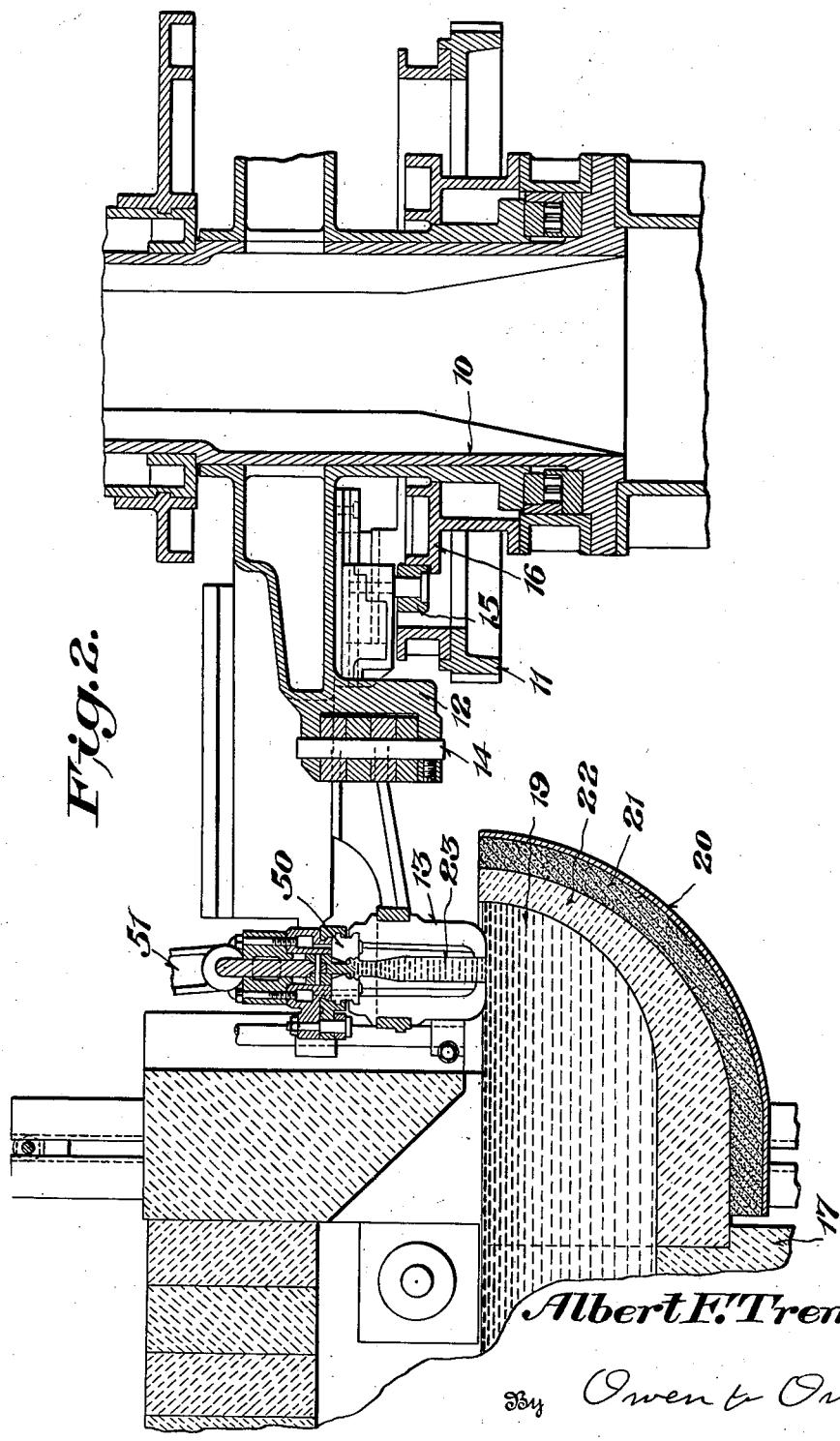

Inventor
Albert F. Tremblay,
By Owen & Owen
Attorneys

Patented May 27, 1941

2,243,267

UNITED STATES PATENT OFFICE 2,243,267

METHOD OF AND APPARATUS FOR BLOWING GLASS

Albert F. Tremblay, Toledo, Ohio, assignor to Kent-Owens Machine Company, Toledo, Ohio, a corporation of Ohio Application October 13, 1937, Serial No. 168,773

11 Claims. (Cl. 49—5)

This invention relates to a method of and apparatus for blowing glass, and has for its principal object the transfer of a blank to a blow mold in such a way that the glass will be evenly distributed in the blown article.

In the type of apparatus where a blank is sucked up from a pool of molten glass and removed from the blank mold and thereafter enclosed and blown in a blow mold, it frequently happens that the pool of glass is hotter at one side than at the other, and that the glass sucked up into the blank is, therefore, hotter on one side than it is on the other. When a blank is bared, that is hotter on one side than the other, whether this condition results from the initial temperature of the glass or from unequal cooling after the glass is sucked from the pool, the blank is apt to become shorter on the relatively cool side than it is on the relatively warm side, thereby resulting in curvature of the blank and the swinging of the bottom of the blank to one side.

Similar differential in the temperature of the two sides of the blank may occur in gob feeding devices or because of conditions arising after the blank has been received in the blank mold. In its broadest scope, this invention applies to curvature of the blank because of heat differential, however that heat differential arises, and might in some instances apply to a condition where the bottom of the blank moves out of alignment with the top for any reason other than heat differential.

The present invention is chiefly directed to the correction of such a condition by contacting the bottom of the blank with the blow mold bottom before the blow mold is closed and moving the bottom of the blank with the blow mold bottom into alignment with the top of the blank so that the blank is properly aligned with the blow mold when the blow mold is closed, and, as a result, the distribution of the glass in the blow mold is relatively uniform.

An application of this invention to one particular type of glass blowing apparatus will be described in detail. It will be readily understood that obvious modifications may be made to utilize the invention with other forms of apparatus. The form of apparatus in connection with which use of the invention will be described in detail is the apparatus disclosed in applicant's prior application for "Blowing glass", filed November 2, 1936, Serial No. 108,691, which has matured into Patent No. 2,168,833, dated August 8, 1939.

In the accompanying drawings forming a part of this disclosure,

Figure 1 is a somewhat diagrammatic plan view showing the operation of the blow mold;

Fig. 2 is a partial section showing the relation of the apparatus to the molten glass at the gathering stage;

Fig. 5 is a detail view showing the relation of the bottom of the blow mold to the bottom of the blank when the movement of the bottom is completed before the closing of the sides of the blow mold.

Figure 3:
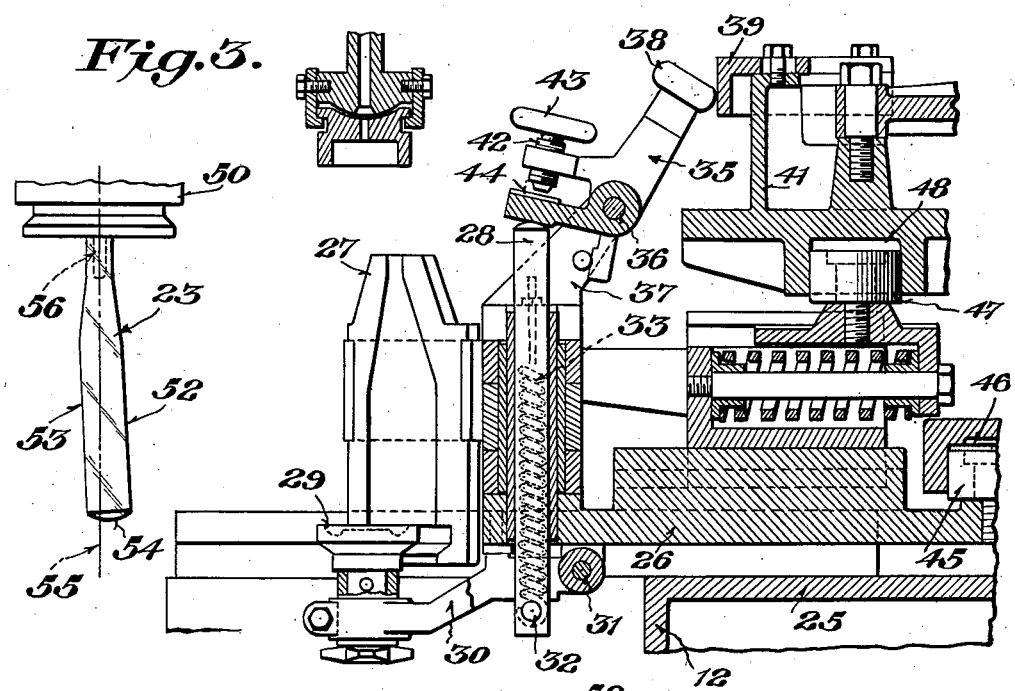
Fig. 3 is a section substantially along the line 3—3 of Fig. 1, and showing the relation of the blow mold to the parison when the parison is suspended in position to be enclosed by the blow mold.

In the embodiment of the invention shown in the drawings, there is indicated enough of the apparatus disclosed in applicant's prior application cited above so that the application of the invention to the apparatus will be readily understood. In connection with Fig. 2, it will be seen that there is a central stationary column 10. The glass gathering and blowing apparatus is rotated about the central column by means of a gear 11 which is attached to a support 12. Parison molds 13 are mounted for opening and closing about pivots 14 on support 12. The mold halves of the parison mold are opened and closed by means of a cam roller 15 which contacts a cam member 16 fixed upon the central pedestal. A tank furnace 17 provides molten glass 18 which flows out into an extension 19. In the construction shown, this extension of molten glass is supported by a metal plate 20 within which there is insulating material 21 minimizing the heat loss from the lining 22 which is in contact with the molten glass. However, in spite of any such arrangement for reducing the heat loss, it is found in practice that the glass next to lining 22 is somewhat cooler than the glass nearer the main body of the furnace, and this condition persists to some extent in the glass that is sucked up into the parison mold to form the blank 23.

It will be understood that the glass is sheared off at the bottom of the blank mold by suitable shearing means, not shown.

A slideway 25 is provided in the upper portion of support 12. A slide 26 is mounted in slideway 25. Blow mold halves 27 are pivoted about pin 28 on slide 26. Mold bottom 29 is mounted upon a swinging frame 30 pivoted at 31 on slide 26 and resting upon a pin 32 passing through the lower end of pivot pin 28. Springs 33 normally raise pin 32 to the position in which it is shown in Fig. 3.

A bell crank lever 35 is pivoted at 36 upon a bracket 37 rising from slide 26. Anti-friction roller 38 at the end of one arm of bell crank lever 37 is adapted to contact in succession cams 39 and 40 which are mounted upon cam support 41 which in turn is mounted upon the central column. A screw 42 is threaded through the other end of bell crank lever 35 and may be readily adjusted at any time by means of a hand wheel 43 so as to adjust the relation of bell crank lever 35 to underlying member 44 which is pivoted about pivot 36 and which rests upon the upper end of pivot pin 28. It will be readily seen that by this means, pivot pin 28 and consequently mold bottom 29 will be depressed by cams 39 and 40, and that the exact degree of this depression can be readily adjusted at any time by means of hand wheel 43.

Slide 26 is controlled by a cam roller 45 running in a cam groove 46 mounted upon the central column, and the mold halves are opened and closed by means of a cam roller 47 running in a cam groove 48 in cam support 41.

A neck mold 50 is controlled by any suitable means to co-act with the blank mold in gathering the blank, supplying an initial puff of air and raising the blank after the parison mold is open to a position such as indicated in Fig. 3 where it may be enclosed by the blow mold. Means 51 is indicated on Fig. 2 for raising the neck mold. Details of one form of apparatus for controlling the neck mold are disclosed in applicant's above cited application, but form no part of the present invention and may be constructed in any suitable way so far as the present invention is concerned.

Figure 4:
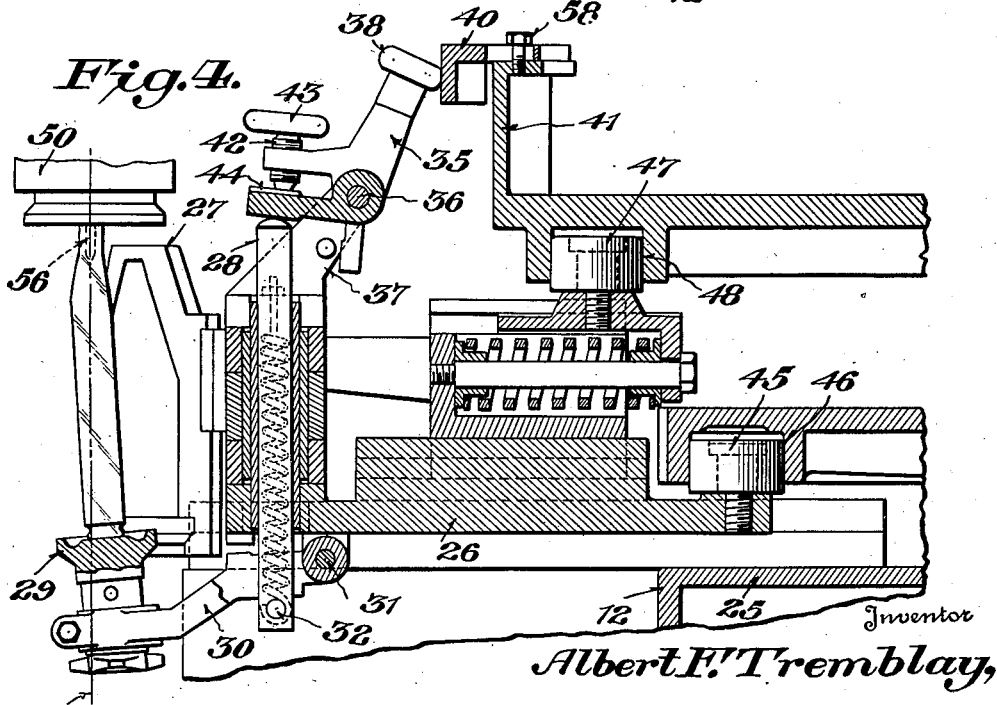
Fig. 4 is a section substantially on the line 4—4 of Fig. 1, and showing the relation of the blow mold to the blank when the bottom of the blank is first contacted by the bottom of the blow mold.

As previously indicated, when parison 23 is gathering, the side 52 towards the center of the apparatus which rotates about column 10 is somewhat cooler than the side 53 which is most distant from that center. Accordingly, when the blank is suspended as shown in Fig. 3, side 52 is likely to be somewhat shorted than side 53, thereby swinging the bottom 54 towards the central column 10. This condition is indicated in Figs. 3 and 4, the condition being shown for purposes of illustration somewhat more accentuated than it is in ordinary operation, although a condition even more accentuated than that shown may occur sometimes.

In the usual operation, a preliminary puff of air is introduced into the parison before it is enclosed in the blow mold to form an initial blow opening 56. This results in a downward flow of the glass at the bottom 54 of the parison, as indicated.

The operation of the apparatus will be fairly clear from the description taken in connection with the drawings, but the essential feature, which consists in the proper positioning of the parison bottom, will be briefly described.

For reasons previously discussed, the suspended parison bottom 54 is frequently swung towards the central column from the axis of the neck mold and the axis about which the blow mold closes, which is indicated for convenience on the drawing by dotted line 55. In the form of apparatus described, the blow mold slide 26 is moved outward to position the blow mold bottom beneath the parison and to register the blow mold with the parison when the blow mold closes. It will be readily understood that cam 39 depresses pivot pin 28 and allows mold bottom 29 to drop, thereby discharging the previously blown bottle. After that, the blow mold bottom is again raised to normal position by springs 33 and remains in that position until pin 28 is again depressed by contact of roller 38 with cam 40. The parts are so arranged that this contact takes place just before the completion of the outward movement of slide 26 so that the bottom is depressed slightly as shown in Fig. 4 just before it reaches its outermost position. The degree of depression is adjusted so that the mold bottom will contact the bottom of the parison when the mold bottom is substantially central of the bottom of the parison. Thereafter, the parison moves with the bottom of the mold into alignment with the top of the parison, thereby properly centering the bottom of the parison. The bottom of the mold is allowed to return to its normal position before the closing of the blow mold halves and thereby spreads the bottom of the parison as indicated in Fig. 5 at 57.

It will be readily seen that, by adjustment of hand wheel 43, the exact degree by which such mold bottom corrects the position of the bottom of the parison can be instantaneously adjusted, while the apparatus is in operation. In addition, cam 40 is mounted upon support 41 by the pin and slot connection 58 so that the cam 40 may be adjusted inward or outward when the conditions change so that a like adjustment is needed upon each of the molds that are mounted in the usual manner in an annular series about the central column.

The apparatus above disclosed is a very simple and efficient and readily adjusted mechanism for accomplishing the desired purpose in connection with apparatus of the type disclosed in applicant's prior application. At the same time, it will be readily understood that the method of operation in which the bottom of the parison is first contacted by a blow mold bottom properly centered with the parison bottom and then the blow mold bottom and parison bottom are together brought into proper alignment with the parison top and with the axis about which the blow mold closes, may be applied to many different forms of apparatus, and this movement of the blow mold bottom may be controlled by any suitable mechanism or in simple apparatus might even be operated by hand.

This application is a continuation-in-part of my above identified application No. 108,691.

What I claim is:

1. Apparatus for gathering and blowing glass comprising a neck mold adapted to suspend a gathering blank, a blow mold bottom, means for moving the bottom laterally and longitudinally of a blank suspended from the blow mold, said means being related so that a portion of the lateral movement occurs alone and a portion of the lateral and longitudinal motion are taking place simultaneously, and means for adjusting the timing of said lateral and longitudinal movements relatively to each other to vary the path of the mold bottom.

2. Glass blowing apparatus comprising a series of blow mold bottoms revoluble about a central axis, means to move the bottoms outward from the axis in succession to blank receiving position, means to impart a vertical component to the movement of each bottom, common means for adjusting the vertical movement of each mold bottom in succession, and individual means for separately adjusting the vertical component of the movement of each bottom.

3. In glass manufacture, the method which comprises suspending an elongated blank of molten glass under conditions which result in the bottom of the blank becoming out of alignment with the top thereof, moving a supporting surface laterally into alignment with the top of the blank and from the side towards which the bottom of the blank tends to swing, and simultaneously moving the supporting surface longitudinally of the blank towards the upper end of the blank, and adjusting the path of the supporting surface so that it will contact the bottom of the blank at such a point in the movement of the supporting surface that the final position of the supporting surface brings the bottom of the blank into alignment with the top thereof.

4. In glass manufacture, the method which comprises suspending an elongated blank of molten glass under conditions which result in the bottom of the blank becoming out of alignment with the top thereof, contacting the blank bottom with a supporting surface suitable for forming a bottom support during the blowing of the blank, the contact being made with said support in proper alignment with the bottom of the blank and thereafter moving the support with the blank bottom in contact therewith into alignment with the top of the blank.

5. A method of gathering and blowing glass which consists in gathering a blank of molten glass, suspending the blank with the glass in the blank hotter at one side than at the other, whereby the blank bottom moves laterally out of alignment with the blank top, contacting the blank bottom with a supporting surface, bringing the blank bottom and blank top into alignment by relative lateral movement of the supporting surface and the blank top, and blowing the aligned blank.

6. A method of gathering and blowing glass which consists in gathering a blank of molten glass, suspending the blank with its bottom laterally out of alignment with its top, contacting the blank bottom with a supporting surface, bringing the blank bottom and blank top into alignment by relative lateral movement of the supporting surface and the blank top, bringing the blank top and supporting surface nearer together and thereby spreading the blank bottom on said surface, and blowing the aligned blank.

7. A method of gathering and blowing glass which consists in gathering a blank from a pool of molten glass that is hotter on one side than on the other, whereby one side of the blank is hotter than the other, suspending the gathered blank while leaving the body free to swing laterally and thereby position its bottom out of alignment with its top, contacting the bottom of the blank and moving it into alignment with the top, and blowing the aligned blank.

8. A method of gathering and blowing glass which consists in gathering a blank from a pool of molten glass one side of which is hotter than the other, suspending the gathered blank with its bottom out of alignment with its top, contacting the bottom of the blank with a supporting surface aligned with the bottom, moving the supporting surface and the bottom laterally into alignment with the top, enclosing the aligned blank in mold sides, and thereafter blowing the blank in said mold.

9. A method of gathering and blowing glass which consists in gathering a blank from a pool of molten glass one side of which is hotter than the other, suspending the gathered blank with its bottom out of alignment with its top, contacting the bottom of the blank with a supporting surface aligned with the bottom, moving the supporting surface and the bottom laterally into alignment with the top of the blank, causing the aligned bottom and top to approach each other, thereby spreading the bottom of the blank on said supporting surface, enclosing the aligned blank in mold sides, and thereafter blowing the blank in said mold.

10. In apparatus of the character described, means to form a blank of predetermined length, a neck mold, the apparatus being operable to suspend a formed blank from the neck mold, a blow mold bottom positioned more than said predetermined length below, and at one side of, the neck mold, and means to produce relative movement of the blow mold bottom and the neck mold through a position in which the bottom and neck mold are said predetermined length apart and are a predetermined amount out of vertical alignment to a position in which they are in vertical alignment and not more than said predetermined length apart.

11. In apparatus of the character described, means to form a blank of predetermined length, a neck mold, the apparatus being operable to suspend a formed blank from the neck mold, a blow mold bottom positioned more than said predetermined length below, and at one side of, the neck mold, and means to produce relative movement of the blow mold bottom and the neck mold through a position in which the bottom and neck mold are said predetermined length apart and are a predetermined amount out of vertical alignment to a position in which they are in vertical alignment and not more than said predetermined length apart, and means to adjust the means to produce the relative movement of the neck mold and bottom to vary the amount they are out of vertical alignment when they reach said predetermined length apart.

ALBERT F. TREMBLAY.